(12) United States Patent
Hammon et al.

(10) Patent No.: US 10,174,935 B2
(45) Date of Patent: Jan. 8, 2019

(54) SYSTEM AND METHOD FOR OPERATING A LIQUID GAS EVAPORATOR

(71) Applicant: BASF SE, Ludwigshafen (DE)

(72) Inventors: Ulrich Hammon, Mannheim (DE); Thomas Walter, Hassloch (DE)

(73) Assignee: BASF SE, Ludwigshafen (DE)

( * ) Notice: Subject to any disclaimer, the term of this patent is extended or adjusted under 35 U.S.C. 154(b) by 141 days.

(21) Appl. No.: 14/738,050

(22) Filed: Jun. 12, 2015

(65) Prior Publication Data

US 2016/0010850 A1    Jan. 14, 2016

Related U.S. Application Data

(60) Provisional application No. 62/021,730, filed on Jul. 8, 2014.

(30) Foreign Application Priority Data

Jul. 8, 2014  (DE) ................. 10 2014 109 539

(51) Int. Cl.
  *F22B 1/02* (2006.01)
  *B01D 1/00* (2006.01)

(52) U.S. Cl.
  CPC ............ *F22B 1/021* (2013.01); *B01D 1/0082* (2013.01); *F17C 2221/035* (2013.01); *F17C 2223/0153* (2013.01); *F17C 2223/033* (2013.01); *F17C 2225/0123* (2013.01); *F17C 2225/035* (2013.01); *F17C 2225/036* (2013.01); *F17C 2227/0393* (2013.01); *F17C 2265/05* (2013.01)

(58) Field of Classification Search
  CPC ............ B01D 1/0082; F17C 2221/035; F17C 2223/0153; F17C 2265/05; F17C 2227/0393; F17C 2225/035; F17C 2225/0123; F17C 2225/036; F22B 1/021
  USPC ........... 122/32, 504, 504.1, 504.2, 506, 507, 122/31.1, 31.2, 33; 159/4.01, 4.06, 16.3, 159/21, 32
  See application file for complete search history.

(56) References Cited

U.S. PATENT DOCUMENTS

| | | | | |
|---|---|---|---|---|
| 2,341,436 | A * | 2/1944 | Getz | A62C 3/065 169/11 |
| 5,156,747 | A * | 10/1992 | Weber | B01D 1/0082 202/197 |
| 2006/0162811 | A1* | 7/2006 | Roach | F17C 3/005 141/325 |

(Continued)

FOREIGN PATENT DOCUMENTS

DE    9311655 U1 *  12/1993

*Primary Examiner* — Steven B McAllister
*Assistant Examiner* — Benjamin W Johnson
(74) *Attorney, Agent, or Firm* — Oblon, McClelland, Maier & Neustadt, L.L.P.

(57) ABSTRACT

A system (1) and method for operating a liquid gas evaporator (3), comprising an evaporator (3), a trough (5) carrying the evaporator (3), a housing (7) which surrounds the evaporator (3) on three sides, at least one detector (9) for sensing liquid gas arranged in the trough (5), a line (11) for the distribution of vapor D on the fourth, non-housed side of the evaporator (3) arranged at the margin of the trough (5) which is not closed off by the housing (7), a feed (13), connected to the line (11), and a regulating valve (15) provided on the feed (13) and connected to the detector (9) and at least one shut-off valve (17).

11 Claims, 1 Drawing Sheet

(56) References Cited

U.S. PATENT DOCUMENTS

2011/0220003 A1* 9/2011 Colmard ............... B01F 5/0212
114/74 R

* cited by examiner

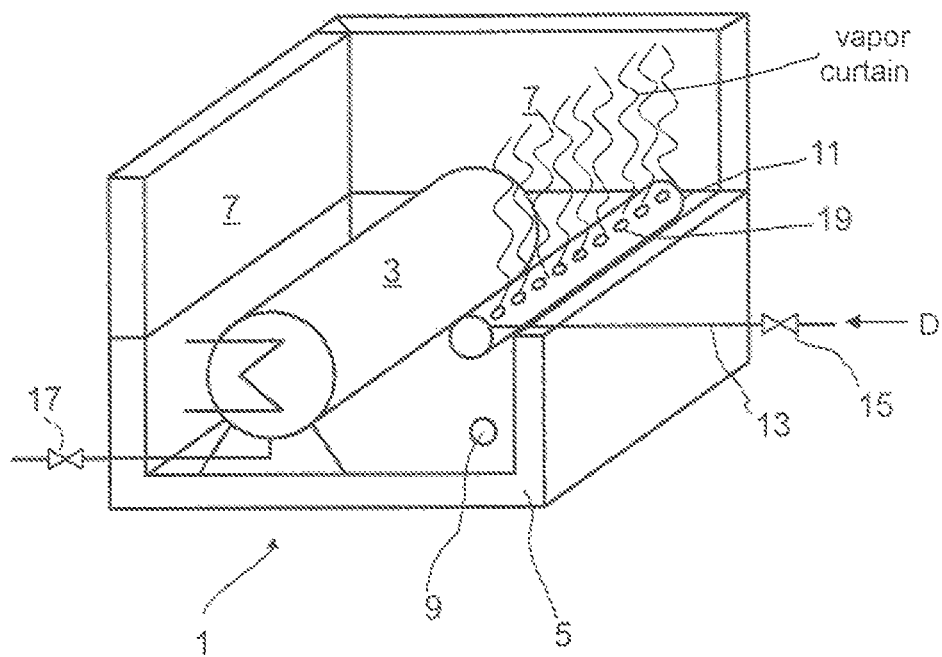

SYSTEM AND METHOD FOR OPERATING A LIQUID GAS EVAPORATOR

This patent application claims the benefit of U.S. provisional patent application Ser. No. 62/021,730 filed on Jul. 8, 2014, incorporated in its entirety herein by reference. The present invention relates to a system and a method for operating a liquid gas evaporator in which a liquid gas is evaporated into its gaseous aggregation state.

Generic evaporators and methods for operating them are known in principle from the prior art (cf., for example, Dubbel, Taschenbuch für den Maschinenbau [Manual of Mechanical Engineering], 13th edition 1974, volume 2, page 502 ff.).

Many chemical syntheses make use of liquid gases which are delivered as liquid and, before being introduced into the synthesis, are evaporated, since they react more efficiently there in their gaseous aggregation state or the reaction temperature lies above the boiling point of the material. Liquid gas evaporators are conventionally designed as horizontal tube bundle heat exchangers, in which the liquid gas is evaporated in the jacket space of the heat exchanger and the energy for evaporation is delivered via the internal heat exchanger tubes of the evaporator. As a rule, the liquid level in such evaporators is kept relatively low so as to minimize the entrainment of drops out of the evaporation apparatus as a result of the gas bubbles which have formed during evaporation. Before the evaporated liquid gas leaves the evaporator, it is usually routed through a drop separator in order to ensure virtually complete drop separation. However, such drop separators are often not sufficient to achieve complete liquid separation. The gas stream of the largely evaporated liquid gas stream is therefore frequently fed to a secondary evaporator or is delivered for synthesis via heated pipelines. This is important particularly in the case of partial oxidations where the liquid gas used (such as, for example, propene, propane, butane, i-butene) is mixed with oxygen-containing gas (for example, air) and optionally with an inert gas (for example, nitrogen or water vapor) and is then routed via reaction tubes filled with a catalyst. Since, in such systems, the monitoring/setting of the mixture ratios with regard to gas to be oxidized, oxygen-containing gas and diluting gas takes place by means of volume flowmeters and, for safety and reaction reasons, narrow limits are placed upon the mixture ratios, the gases delivered should also not contain any liquid constituents for reasons of catalyst protection.

What is critical in the operation of liquid gas evaporators is if the heating medium fails and the evaporation of the liquid gas continues. Under these conditions, the temperature in the evaporator drops very quickly. This may possibly lead to the formation of ice in the evaporator if water has entered the evaporator via the liquid gas without being noticed, and the water can then freeze and expose the jacket space of the evaporator to inadmissibly high pressure stress, thus leading in the worst case to the bursting of the evaporator.

The problem with such evaporators is that, in the event of leakage in the surroundings of the evaporator, concentrations of the liquid gas or of its gaseous aggregation state or mixtures thereof are formed and are explosive. Consequently, ignition sources in the surroundings of such evaporators must as far as possible be avoided, in order to avoid an explosion in the event of leakage. This is important particularly for chemical plants, since many machines and apparatuses which may be considered as a potential ignition source are operated there. For this reason, generic evaporators are often placed at the margin of a chemical plant or arranged on the periphery of the terrain in order to minimize the risks of explosion. The risk of explosion can thereby be reduced within certain limits at a distance from potential ignition sources. However, the decentral installation of a generic evaporator necessitates, on the one hand, markedly longer supply lines to the reactor and, on the other hand, larger areas to which special safety measures apply. The decentral installation of the evaporator therefore entails an increased outlay in terms of plant technology and a markedly increased space requirement. There is therefore a need for integrated installation of the generic evaporator in local proximity to the actual reactor which at the same time fulfils the safety requirements.

The object on which the present invention is based is, therefore, to provide a system for operating an evaporator and to specify a method for operating an evaporator, by means of which liquid gases can be reliably operated in local proximity to potential ignition sources, for example a hot reactor.

This object is achieved, in a first aspect of the present invention, by means of a system (1) for operating a liquid gas evaporator (3), comprising
- an evaporator (3) for evaporating a liquid gas into its gaseous aggregation state,
- a trough (5) carrying the evaporator (3),
- a housing (7) which surrounds the evaporator (3) on three sides and which terminates flush with the trough (5),
- at least one detector (9) which is sensitive to the liquid gas and to its gaseous aggregation state and which is arranged in the trough (5),
- a line (11) for the distribution of vapor D, which is provided on the fourth, non-housed side of the evaporator (3) and which is arranged at that margin of the trough (5) which is not closed off by the housing (7),
- a feed (13), connected to the line (11), for the vapor D,
- a regulating valve (15) provided on the feed (13) and connected to the detector (9), and
- at least one shut-off valve (17) for the liquid gas.

The abovementioned object is achieved, furthermore, by means of a method for operating an evaporator (3), comprising the steps
a) evaporation of a liquid gas into its gaseous aggregation state in an evaporator (3) which is comprised in a system (1) according to the invention,
b) detection of the concentration of the liquid gas and/or of its gaseous aggregation state in the trough (5) carrying the evaporator (3),
c) upon detection of a predetermined critical concentration value of the liquid gas and/or of its gaseous aggregation state in the trough (5), actuation of the regulating valve (15) on the feed (13) and consequently introduction of vapor D into the line (11) and closing of the liquid gas feed to the evaporator (3) by means of a shut-off valve (17),
d) spraying of the vapor D out of the orifices (19) in the line (11), and
e) formation of a vapor curtain above the line (11) in the vertical direction on the fourth, non-housed side of the evaporator (3).

The system (1) according to the invention and the method according to the invention offer the advantage that the evaporator (3) can be arranged in direct local proximity to a reactor for the further processing of the gaseous liquid gas, and at the same time the risk of the formation of an ignitable mixture from the liquid/gaseous liquid gas and air is effectively prevented.

When method features are listed below with regard to the system (1), these relate particularly to the below-described method according to the invention. Substantive features which are mentioned in connection with the method according to the invention likewise relate particularly to the system (1) according to the invention.

The present invention is described in detail below.

A first aspect of the present invention relates to a system (1) for operating a liquid gas evaporator (3), comprising
- an evaporator (3) for evaporating a liquid gas into its gaseous aggregation state,
- a trough (5) carrying the evaporator (3),
- a housing (7) which surrounds the evaporator (3) on three sides and which terminates flush with the trough (5),
- at least one detector (9) which is sensitive to the liquid gas and its gaseous aggregation state and which is arranged in the trough (5),
- a line (11) for the distribution of vapor D, which is provided on the fourth, non-housed side of the evaporator (3) and which is arranged at that margin of the trough (5) which is not closed off by the housing (7),
- a feed (13), connected to the line (11), for the vapor D,
- a regulating valve (15) provided on the feed (13) and connected to the detector (9), and
- at least one shut-off valve (17) for the liquid gas.

The system (1) according to the invention has the advantage that the evaporator (3) is surrounded on three sides by a stable housing (7) which shields surrounding plant parts against liquid gas and/or its gaseous aggregation state possibly escaping and coming into contact with them. On the fourth, non-housed side of the evaporator (3) with the line (11) provided there, a vapor curtain can be generated which also shields this open side from the surroundings. Furthermore, the type of construction of the housing (7) whereby it is open toward one side affords the possibility that the evaporator (3) is essentially freely accessible, for example for maintenance or cleaning work or for firefighting in the event of a fire.

Liquid gas is understood in the context of the present invention to mean short-chain hydrocarbons or a mixture of two or more short-chain hydrocarbons which remain liquid at room temperature under relatively low pressure (<20 bar). Concrete examples of liquid gases in the context of the invention are propane, propylene, butane, butene, iso-butane and iso-butene.

The evaporator (3) is a conventional device which is suitable for the evaporation of liquid gases. Examples of the evaporator (3) are, for example, horizontal tube bundle evaporators with a heating medium in the tubes and with a medium to be evaporated on the jacket side of the evaporator.

The trough (5) carrying the evaporator (3) is formed from a solid material impenetrable to the liquid gas or its gaseous aggregation state. In particular, metals/metal alloys or concrete may serve as materials. The trough (5) has, in particular, the task of retaining, at least for some time, the liquid gas (heavy gas) escaping in the event of a leakage and of thus allowing simpler and quicker detection via a gas sensor. The volume of the trough (5) in this case corresponds at least to double the spatial volume which the entire evaporator (3) occupies.

The housing (7) surrounding the evaporator (3) on three sides is constructed from a stable material which, in the event of an explosion, withstands the pressure wave which arises. Metals/metal alloys or concrete are likewise suitable here as materials. The housing terminates flush with the trough (5), that is to say the housing (7) is seated, in particular, on the trough (5) and is essentially leaktight to the liquid gas and its gaseous aggregation state. The height of the housing amounts to at least the height of the evaporator (3), preferably to 1.5 times the construction height of the evaporator (3) above the trough bottom. Where the housing (7) is concerned, it is customary linguistically also to speak of a "firewall".

The detector (9), as used in the present invention, is preferably a gas detector which is capable of detecting, at least in the region of 10% of the lower explosion limit, the corresponding liquid gas and/or its gaseous aggregation state or of measuring its volume concentration.

The line (11) provided on the fourth, non-housed side of the evaporator (3) is, in particular, a pipeline, the material used being, in particular, metals, preferably steel. The line (11) is designed to be pressure-resistant to an extent such that it withstands the pressure of the vapor D. The fact that the line (11) is arranged "at" that margin of the trough (5) which is not closed off by the housing (7) means that it may be provided both on the margin and so as to be offset inward next to the margin.

The vapor D which can be routed via the feed (13) into the line (11) may come from a general vapor line present in chemical plants.

The regulating valve (15) serves, in particular, for opening/closing the feed (13) for the vapor D into the line (11). The shut-off valve (19), particularly in the event of a leakage, prevents the further feed of liquid gas to the evaporator (3).

In a development of the system (1) according to the invention, the line (11) extends over the entire width of the fourth, non-housed side of the evaporator (3). This ensures that a vapor curtain can be formed on the entire fourth, non-housed side of the evaporator (3), so that, in the event of a leakage of the evaporator (3), no liquid gas and/or its gaseous aggregation state escapes outwardly.

According to one embodiment of the system (1), the line (11) has at regular intervals orifices (19) which are oriented essentially vertically upward. These orifices (19) are, in particular, bores. "Oriented essentially vertically upward" means in this context that the vapor curtain can be formed at an angle of 0° to 10° to the vertical.

In order, in the event of a leakage, to prevent the liquid gas and/or its gaseous aggregation state from coming into contact with other plant parts, it has proved expedient if the fourth, non-housed side of the evaporator (3) is oriented so as to face away from a plant for the further processing of the liquid material and/or of its gaseous aggregation state. In this case, the liquid gas and/or its gaseous aggregation state, in principle, flows away from the plant. Moreover, the fourth, non-housed side of the evaporator (3) forms a good assault path for intervention vehicles and/or rescue workers (for example, firefighters, etc.), since it is easily accessible to the outside due to the orientation of the fourth side.

Furthermore, it has proved advantageous if, in a further embodiment, the system (1) is arranged so as to be elevated in relation to a plant for the further processing of the liquid material and/or of its gaseous aggregation state, for example on a roof or on the highest platform of the plant, so that the vapor curtain can radiate freely upward.

A second aspect of the present invention relates to a method for operating a liquid gas evaporator (3), comprising the steps
a) evaporation of a liquid gas into its gaseous aggregation state in an evaporator (3) which is comprised in a system (1) as claimed in one of claims 1 to 5, b) detection of the concentration of the liquid gas and/or of its gaseous aggregation state in the trough (5) carrying the evaporator (3), c) upon detection of a predetermined critical concentration value of the liquid gas and/or of its gaseous aggregation state in the trough (5), actuation, in particular opening, of the regulating valve (15) on the feed (13) and consequently introduction of vapor D into the line (11) and closing of the liquid gas feed to the evaporator (3) by means of a shut-off valve (17), d) spraying of the vapor D out of the orifices (19) in the line (11), and e) formation of a vapor curtain above the line (11) in the vertical direction on the fourth, non-housed side of the evaporator (3).

The method according to the invention has essentially the same advantages as the system (1) according to the invention, to be precise that, by means of the fourth, non-housed side of the evaporator (3) with the line (11) provided there, a vapor curtain can be generated which also shields this open side from the surroundings.

In particular, the formation of a vapor curtain on the fourth, non-housed side of the evaporator (3) only in the case of leakage ensures that no explodable mixture of the liquid gas and/or its gaseous aggregation state and of air is formed in the surroundings of the evaporator (3).

In a development of the method, the vapor curtain is formed at least over the entire width of the fourth, non-housed side of the evaporator (3). This ensures that this fourth, non-housed side is completely shielded by the vapor curtain. In a development, it is possible to extend the width of the vapor curtain beyond the lateral ends of the housing (7) in order to build up a further safety region.

During evaporation, the liquid gas forms, in particular, a heavy gas which collects in the trough (5). According to the present invention, all gases, of which the density ratio with air is greater than 1, are designated as heavy gas. These heavy gases, when they spread out, sink to the bottom and, according to the invention, first collect in the trough (5), without passing into the surroundings of the evaporator (3).

In one embodiment of the invention, it is preferable that the vapor D is fed with a pressure of at least 4 bar, preferably with a pressure of between 10 bar and 35 bar, into the line (11).

In a development of the invention, by the spraying of the vapor D in step d), on the one hand, air is sucked in from outside the system (1) and, on the other hand, the liquid gas and/or its gaseous aggregation state are/is entrained out of the trough (5), so that the concentration of the liquid gas and/or of its gaseous aggregation state is diluted to a noncritical value. By means of this measure according to the invention, it is possible in a simple way to dilute the liquid gas and/or its gaseous aggregation state essentially independently of its quantity and/or concentration in the trough (5) to an extent such that an explosive mixture is no longer present.

Further aims, features, advantages and possibilities of use will be gathered from the following description of exemplary embodiments, not restricting the invention, with reference to the FIGURE. In this case, all the features described and/or pictorially illustrated constitute in themselves or in any combination the subject matter of the invention, even independently of their amalgamation in the claims or their back reference.

FIG. 1 shows a diagrammatical illustration of the system 1 according to the invention.

FIG. 1 shows diagrammatically the system 1 according to the invention in one embodiment. The evaporator 3, which is installed in a trough 5, is illustrated in the middle. The evaporator 3 is surrounded on three sides (here, left, front and rear) by the housing 7, the front side of the system 1 being illustrated, cut away, here, so that the third side of the housing 7 cannot be seen at the front. This housing 7 is absent on the fourth side (here, right). Instead, a line 11, which is supplied by a feed 13, is provided for vapor.

Furthermore, in the trough 5, at least one detector 9 is arranged, which continuously measures the concentration of the liquid gas or of its gaseous aggregation state, evaporated in the evaporator 3, in the trough 5. When a critical concentration of the liquid gas is exceeded, the detector 9 directly or indirectly switches the regulating valve 15, so that the feed 13 is opened for the vapor D which flows with a pressure of at least 4 bar into the line 11. By means of a number of orifices 19, in particular bores, distributed over the length of the line 11, the vapor is sprayed, in order thereby to form a vapor curtain. At the same time, the further feed of liquid gas to the evaporator 3 is prevented by means of the shut-off valve 17.

As is likewise evident from the illustration of FIG. 1, the housing 7 is open upwardly. For the present invention, there is no provision for providing a fixed cover or a fixed roof on the housing 7. However, an open structure, for example a grid, may function as covering. The fourth, non-housed side of the evaporator 3 may likewise be closed, for example, by means of a grid, in order to prevent unauthorized access. The implementation of the present invention is not impaired by the provision of such grids.

If, in the event of a leakage of the evaporator 3, the liquid gas and/or its gaseous aggregation state intended to be evaporated therein escapes and collects in the trough 5, the detector 9 is provided. This device is suitable essentially for all heavy gases and liquid gases, for example for hydrocarbons with three to five carbon atoms. However, the device may also be used for higher hydrocarbons.

Before an explosion-critical mixture of the liquid gas or its gaseous aggregation state and of air is reached, the vapor D is introduced into the line 11 and is sprayed via the orifices 19 in the line 11, so that, as already illustrated, the vapor curtain is formed. During the spraying of the vapor D, the liquid gas or its gaseous aggregation state is entrained out of the trough 5, while at the same time air is sucked in from outside the system 1. This entrainment causes such a high dilution of the liquid gas or its gaseous aggregation state that the mixture reaches a concentration which is noncritical for explosions. In particular, the injector action of the vapor D contributes to this.

A concrete embodiment of the present invention is a propylene evaporator which precedes a plant for the production of acrylic acid.

The invention claimed is:

1. A liquid gas evaporator system comprising:
    a liquid gas evaporator for evaporating a liquid gas into its gaseous aggregation state,
    a trough carrying the liquid gas evaporator,
    a housing disposed on the trough that has an open top side, three side walls that surround the liquid gas evaporator, and an open side disposed between the side walls, the open top side and the trough, wherein the open side of the housing forms a non-housed side of the liquid gas evaporator,
    at least one detector, arranged in the trough, for detection of the liquid gas and its gaseous aggregation state, a line for distribution of vapor D, which is provided on the non-housed side of the liquid gas evaporator, wherein the line has orifices for spraying the vapor D outside the line, configured such that upon exiting the line, the vapor D travels vertically upward relative to the line, a feed, connected to the line, for running the vapor D into the line, a regulating valve provided on the feed, wherein the regulating valve is connected to the at least one detector, and at least one shut-off valve that prevents a further feed of the liquid gas to the evaporator in the event of a leakage.

2. The system of claim 1, wherein the line extends over an entire width of the non-housed side of the liquid gas evaporator.

3. The system of claim 1, wherein the line has orifices at intervals that are oriented essentially vertically upward.

4. The system of claim 1, wherein the non-housed side of the liquid gas evaporator is oriented to face away from a plant for processing of the liquid gas or of its gaseous aggregation state.

5. The system of claim 1, wherein the system is arranged to be elevated in relation to a plant for processing of the liquid gas or of its gaseous aggregation state.

6. A method for operating the system of claim 1, the method comprising:

a) evaporating a liquid gas into its gaseous aggregation state in the evaporator, b) detecting a concentration of the liquid gas or of its gaseous aggregation state in the trough carrying the evaporator, c) upon the detection of a predetermined critical concentration value of the liquid gas or of its gaseous aggregation state in the trough, actuating the regulating valve on the feed and consequently introducing vapor D into the line and closing the liquid gas feed to the evaporator by the at least one shut-off valve, d) spraying the vapor D out of orifices in the line, and e) forming a vapor curtain above the line on the non-housed side of the evaporator.

7. The method of claim 6, wherein the vapor curtain is formed at least over an entire width of the non-housed side of the evaporator.

8. The method of claim 6, wherein a liquid material forms during evaporation, a heavy gas that collects in the trough.

9. The method of claim 6, wherein the vapor D is fed with a pressure of at least 4 bar into the line.

10. The method of claim 6, wherein the vapor D is fed with a pressure of from 10 bar to 35 bar into the line.

11. The method of claim 6, wherein by the spraying of the vapor D in d), air is sucked in from outside the system and the liquid gas or its gaseous aggregation state is entrained out of the trough, thereby diluting the concentration of the liquid gas or the concentration of its gaseous aggregation state to a noncritical value.

\* \* \* \* \*